Figure 1:
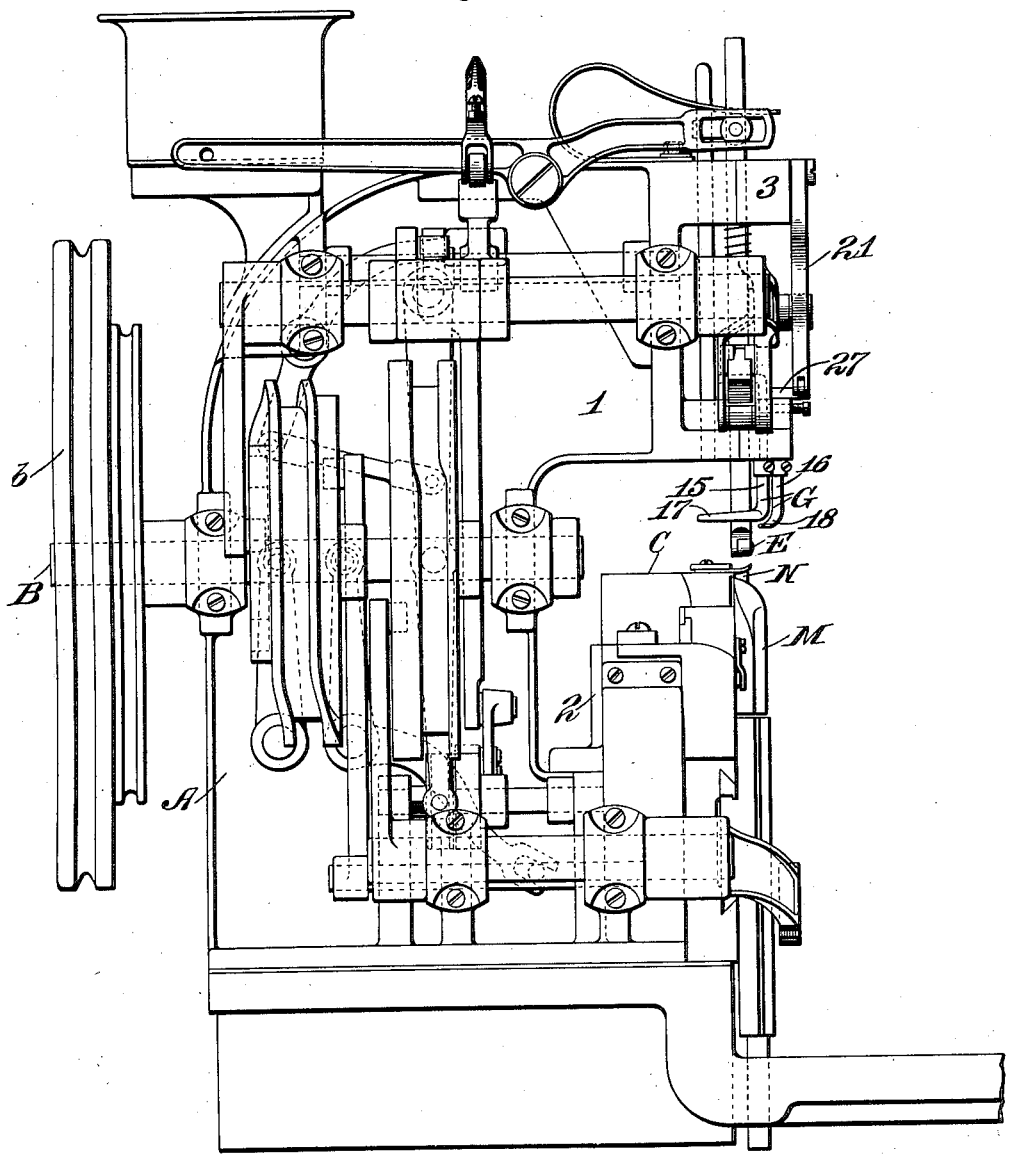

No. 812,641. PATENTED FEB. 13, 1906.
G. L. CORCORAN & G. A. DOBYNE.
SEWING MACHINE.
APPLICATION FILED AUG. 11, 1905.

6 SHEETS—SHEET 1.

Witnesses:
G. A. Pennington
O. F. Funk

Inventors:
George L. Corcoran,
George A. Dobyne,
by Bakewell Cornwall
Attys

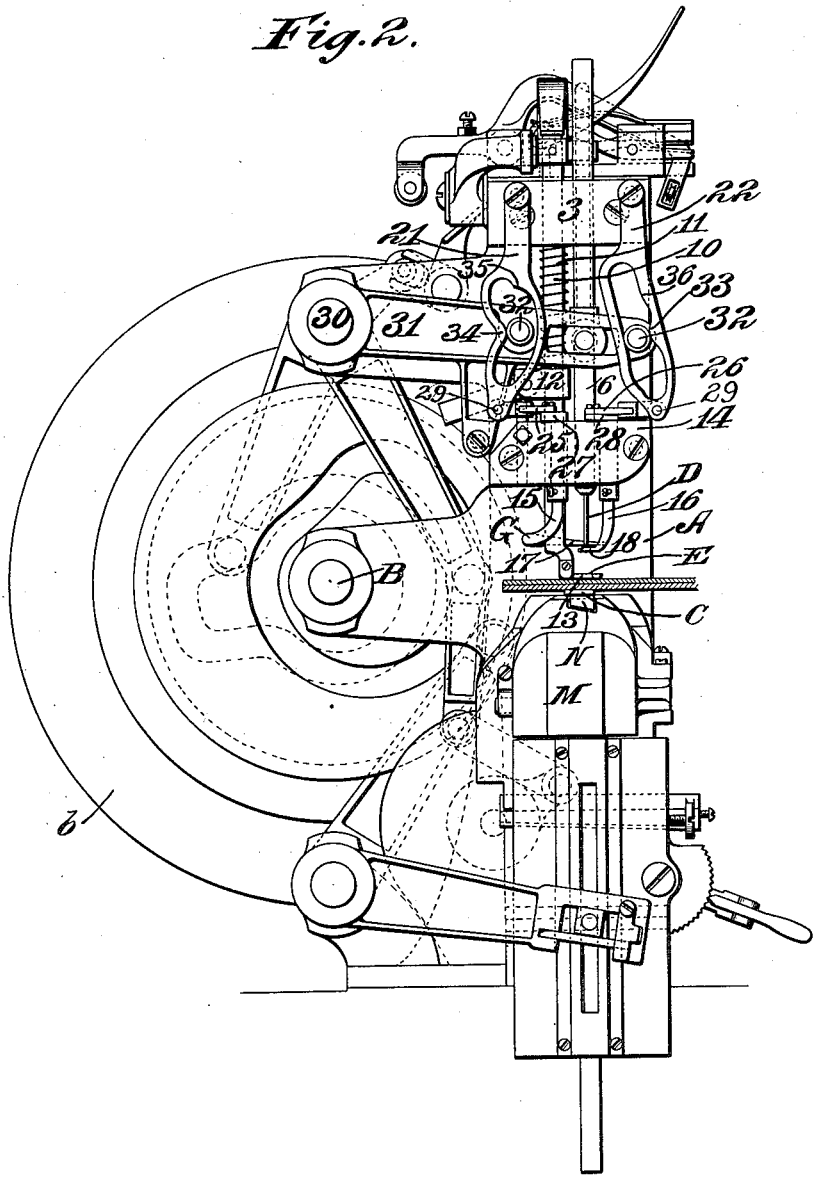

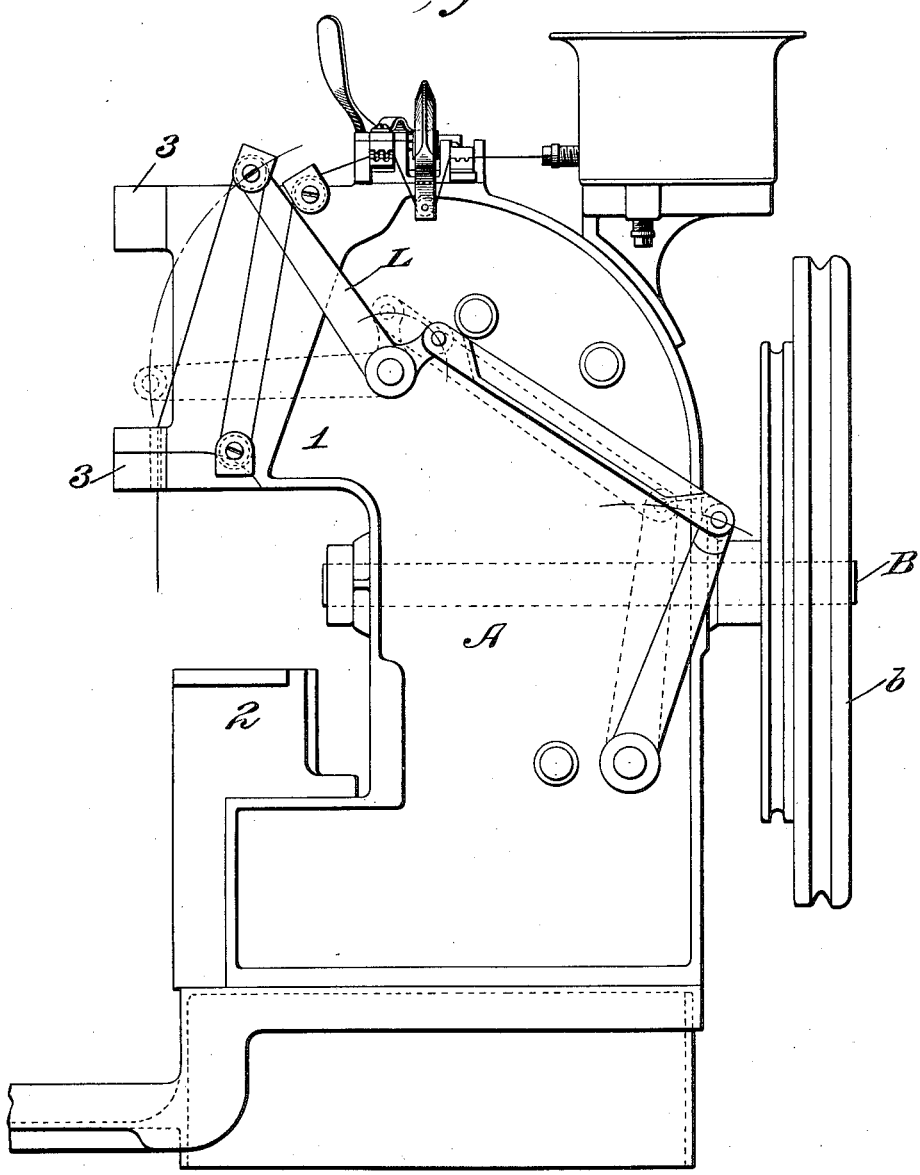

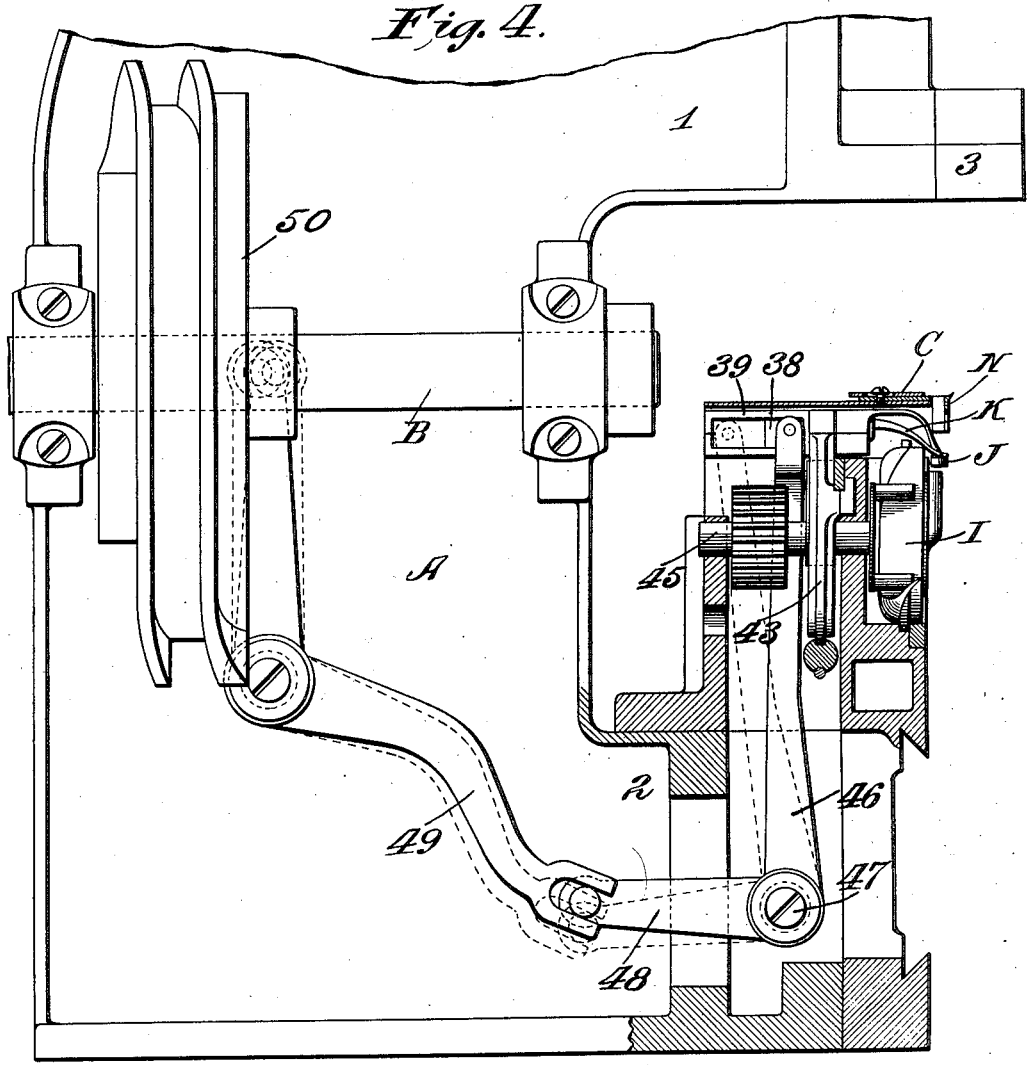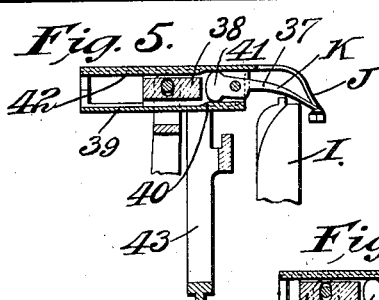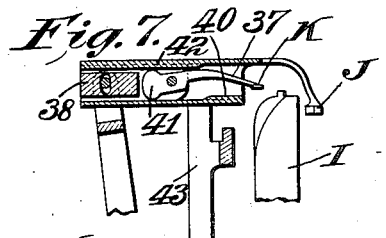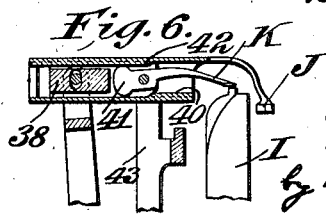

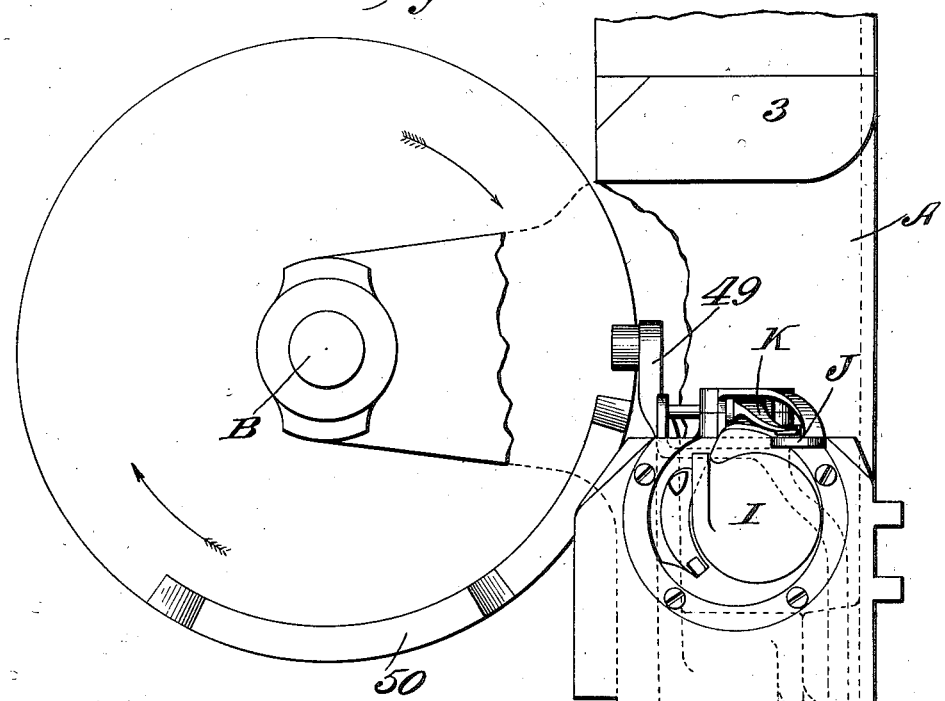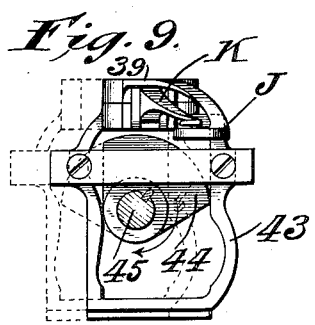

No. 812,641. PATENTED FEB. 13, 1906.
G. L. CORCORAN & G. A. DOBYNE.
SEWING MACHINE.
APPLICATION FILED AUG. 11, 1905.
6 SHEETS—SHEET 6.
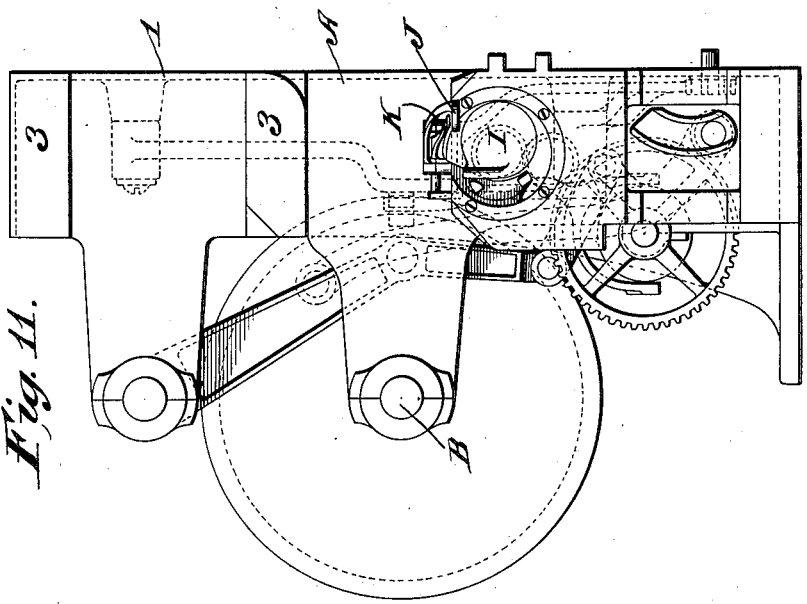
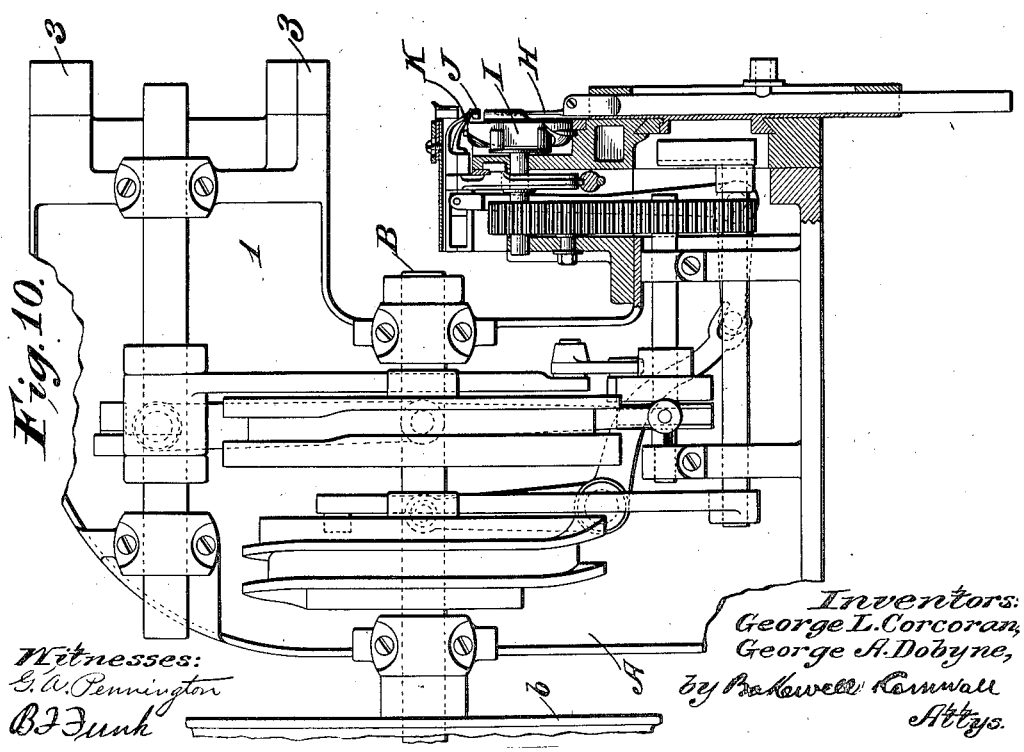

UNITED STATES PATENT OFFICE.

GEORGE L. CORCORAN AND GEORGE A. DOBYNE, OF ST. LOUIS, MISSOURI, ASSIGNORS TO CHAMPION SHOE MACHINERY COMPANY, OF ST. LOUIS, MISSOURI, A CORPORATION OF MISSOURI.

SEWING-MACHINE.

No. 812,641. Specification of Letters Patent. Patented Feb. 13, 1906.

Application filed August 11, 1905. Serial No. 273,778.

*To all whom it may concern:*

Be it known that we, GEORGE L. CORCORAN and GEORGE A. DOBYNE, citizens of the United States, residing at St. Louis, Missouri, have invented a certain new and useful Improvement in Sewing-Machines, of which the following is a full, clear, and exact description, such as will enable others skilled in the art to which it appertains to make and use the same, reference being had to the accompanying drawings, forming part of this specification, in which—

Figure 1 is a side elevational view of a machine constructed in accordance with our invention. Fig. 2 is a front elevational view of the machine. Fig. 3 is a side elevational view showing the take-up mechanism. Fig. 4 is an enlarged view through the shuttle mechanism and the loop-spreading mechanism. Fig. 5 is a longitudinal sectional view through part of the loop-spreading mechanism, showing the positions of the parts prior to spreading the loop. Fig. 6 is a similar view showing the positions of the parts when the loop is being spread. Fig. 7 is a similar view showing the positions of the parts after the loop has been spread. Fig. 8 is a front elevational view of the loop-spreading mechanism. Fig. 9 is a detail view of the frame which carries the loop-spreaders and the cam for operating them. Fig. 10 is a side elevational view of the machine, part of the frame being shown in section to illustrate the loop-spreading mechanism and shuttle-operating mechanism; and Fig. 11 is a detail front elevational view of the machine with some of the mechanism removed.

Our invention relates to sewing-machines, and particularly to sewing-machines of the type shown in United States Patent No. 760,732, granted to us May 24, 1904.

One of the objects of the invention is to provide a machine of the type referred to with an improved and efficient loop-spreading mechanism.

To this end the invention consists in certain novel parts and combinations of parts, all of which will be clearly disclosed hereinafter, and particularly recited in the claims.

Referring now more particularly to the drawings, A indicates the supporting stand or frame, which has lateral extensions, (designated by the reference-numerals 1 and 2, respectively,) which extensions are designed to carry the working parts of the needle mechanism, spreading mechanism, and thread-laying mechanism, as will be presently explained. The head 3, secured to the upper extension 1, carries the thread-laying mechanism, while the end of the lower extension 2 carries the shuttle mechanism and the loop-spreading mechanism.

B is the driving-shaft, provided with a drive-pulley b.

C is the work-table, arranged in the usual manner.

D designates the awl; E, the presser-foot; G, the devices for laying the thread across the needle to enable the same to be caught by the barb, and L designates the take-up.

H designates the needle, (see Fig. 10,) and I the shuttle.

J is the loop-opener, which enters the loop to primarily spread the same, and K indicates the loop-spreader, which completes the spreading of the loop.

The operation of the parts just described is as follows: Assuming that the work is upon the work-table and that the shaft B has commenced to rotate, the awl will descend slightly and then commence to rise, the needle commences to rise, and the take-up moves backwardly in order to take up the loop of the last stitch and to measure off the thread for the stitch about to be formed. As the needle passes through the work and about reaches the end of its upward movement the presser-foot rises and the needle shifts horizontally in order to feed the work, as indicated in Patent No. 760,732, above referred to. The presser-foot then falls, and while the needle is in its projected position through the work the thread-laying devices move to lay the upper thread into position to be engaged by the barb of the needle, the take-up moving forwardly during the thread-laying movement of the thread-laying devices in order to pay out sufficient thread to form one side of the open loop. The needle then descends and its barb engages the upper thread, which has just been laid in position, the thread-laying devices moving into normal position and the take-up moving forwardly to pay out sufficient thread to permit the formation of the open loop without pulling the thread across the barb of the needle, and after the needle has descended to a point below the work to form a loop in the thread the loop-opener enters the loop to primarily spread the same, the loop-spreader K then engaging the thread and moving rearwardly to spread the loop for the entrance of the point of the shuttle. As herein shown, the thread-laying mechanism is so constructed that the thread will be laid into engagement with the barb of the needle without any undue stress or without liability of fraying the thread by pulling it across the barb. Heretofore the thread was caused to engage the barb of the needle in such a manner that in pulling the loop to make the stitch the fibers were liable to become broken, so that the strength of the thread would be materially decreased, with obvious disadvantages. With our improved device, however, the thread-laying mechanism is so constucted that any liability of the thread becoming frayed will be avoided. After the loop-spreader K has engaged the thread of the loop the needle will rise slightly, and the loop-spreader will then move rearwardly, the upward movement of the needle being sufficient to carry its barb into a slot in the loop-opener J. As the point of the shuttle enters the loop the continued rotary movement of the shuttle will carry the loop away from the needle, which may descend free of the upper thread. The needle continues to descend until it reaches its lowermost position and then moves laterally back into starting position, ready to again pass up through the work, while the shuttle continues to rotate until it finally comes to rest. The take-up has meanwhile paid out sufficient thread to permit the loop to be carried around by the shuttle and then recedes in order to take up the loop which has caught the bobbin or under thread before it has been drawn taut. As the take-up completes its loop-drawing movement the awl descends to pierce the work preparatory to the formation of the stitch next following.

For convenience of description we have referred to the thread which is drawn down through the work by the needle as the "upper" thread and to the thread from the bobbin as the "lower" thread, and we shall hereinafter refer to these threads by such terms. We do not, however, mean to imply by these terms that the thread engaged by the needle is necessarily above the bobbin thread or that the so-called "lower" thread is necessarily below the so-called "upper" thread.

The awl-bar 6 is supported in the head 3 to reciprocate vertically, the awl D being secured to said bar in any convenient manner. The presser-bar 10, which is parallel with the awl-bar, is also supported in the head 3 to reciprocate vertically and is yieldingly held in lowermost position upon the work by means of a spring 11, coiled about the presser-bar and lying between a collar 12 upon said bar and some suitable portion of the machine-head. The presser-foot E is secured to its bar in any suitable manner and has a slot 13, through which the awl is adapted to operate, the needle also being adapted to extend into said slot and to move therein in order to feed the work.

Journaled in the lower portion 14 of the head 3 are vertical oscillatory shafts 15 and 16, each of which carries a horizontal arm 17 and 18, respectively, similar in construction to those described in the patent referred to, the arm 17 lying above the arm 18 and being provided with a thread-eye. The arm 18 is provided in its edge with a notch which is adjacent to the thread-eye of the arm 17 when the parts are in normal position. The upper thread passes through the eye in the arm 17, so that the arm 17 is a thread-carrier, and in the normal position of the parts this thread-carrier and the coöperatiug arm 18 lie out of the way of the awl and the presser-foot, and said thread-carrier holds the thread out of the way of these parts, the arm 18 being held in a position which may be termed "in rear of the upper thread and out of engagement therewith." Pivoted to the head of the machine are levers or rock-plates 21 and 22, each of which is provided with an irregularly-shaped slot. These levers or rock-plates have at their lower ends substantial universal connection with the links 25 and 26, which are respectively pivoted to crank-arms 27 and 28 upon the oscillatory shafts 15 and 16, the connection between the link and rock-plates being here shown as provided by a pin 29, extending into the rock-plates, the link being loosely pivoted upon said pin. Journaled upon the standard is a horizontal rock-shaft 30, which carries upon its forward end a rock-arm 31, and upon said rock-arm are studs or pins 32, which respectively enter the slots in the rock-levers. As the rock-arm is rocked upwardly the studs move idly in the slots of the rock-plates and then engage portions of said slots, whereby said rock-plates are rocked. As these rock-plates move the oscillatory shafts 15 and 16 are moved about their axis, the shaft 16 moving first, whereby the thread-spreading arm 18 first engages the upper thread in its notch, and said arm and the thread-carrier 17 then move oppositely across the vertical plane including the needle (which has been raised) in order to lay the thread upon the needle. As the rock-arm rocks downwardly the thread-laying devices are returned to their normal position. The rock-plates are so arranged that as the needle moves up through the work the coöperating members 17 and 18 move in a horizontal position to lay the upper thread across the needle to enable the same to be caught by the barb.

The general construction of the thread-laying devices 17 and 18 is similar to the devices described in our prior patent referred to; but the operation of said devices and the mechanism for actuating them are different from that described in said patent and are constructed as follows: On the rock-lever 22 is a cam projection 33, and on the rock-lever 21 is a cam projection 34, said cam projection being intermediate the ends of the slot and at the edge thereof. A cam projection 35 is also provided on the edge of the lever 21, as will be clearly indicated in Fig. 2. The operation of the thread-laying mechanism will therefore be as follows: The normal positions of the several parts being shown in Fig. 2, it will be seen that by operating the rock-shaft 30 the arm 31 will be actuated, so as to move the rollers 32 in the respective slots of the rock-arms in a downward direction. The awl will then descend and the element 18 will move outward while the element 17 moves inward to hold the thread in a horizontal plane in the path of the needle to be engaged by the barb thereof, so that the thread will be placed in engagement with the barb of the needle without any liability of said thread becoming frayed. Upon the reversal of the movement of the rock-shaft 30 the arm 31 will start up, so that the roller 32, coöperating with the lever 21, will rest against the cam projection 35 and the roller coöperating with the lever 22 will rest against the cam projection 36, so that the elements 17 and 18 will be restored to their normal positions. The needle will then start down, the barb thereon engaging the thread and drawing it down through the work, the loop-opener entering the loop to partially spread it and the loop-spreader 37 engaging the thread to open the loop sufficiently for the shuttle to pass therethrough and complete the stitch.

The general operation of the loop-spreading mechanism having been briefly described, the specific construction of said mechanism will now be described, as it forms the novel feature of our present invention.

Referring to Figs. 5 to 9 of the drawings, it will be seen that the loop-spreader K is pivoted to a sliding bar 38, which moves backwardly and forwardly in a guide-housing 39. This guide-housing is provided in its lower portion with an offset 40, which is adapted to be engaged by the terminal head 41 on the loop-spreader K when said loop-spreader is in its extreme forward position, wherein it lies very close to the loop-opener J, as shown in Fig. 5. If the hooked end of the loop-spreader was located some distance above the loop-opener when said loop-spreader was in its extreme forward position, it would be liable to not engage the thread, especially if the loop in the thread was twisted. By mounting the loop-spreader so that it will lie practically upon the loop-opener when it is in its extreme forward position said loop-spreader will be sure to engage the loop when the loop-opener penetrates the loop to primarily spread the same; but when the bar 38 is slid rearwardly the headed portion 41 of the loop-spreader K will ride down the offset 40, its downward position being insured by the offset 42 in the upper portion of the housing 39, which offset 42 is in rear of the offset 40. Therefore the rearward movement of the bar 38 will cause the downward and rearward movement of the rear end of the loop-spreader K, and thus cause the forward end, which engages the thread, to have an upward-and-rearward swinging movement so that the loop-spreader K may be said to oscillate on its carrier. The upward-and-rearward swinging movement of the loop-spreader K is accomplished for the purpose of permitting the loop-spreader to not only move in a rearward direction to hold the loop in the thread in a position for engagement with the point of the shuttle, but also so that the forward hooked end may be raised out of the way of the shuttle as its point enters the loop in the thread. The loop-opener J is shown as being formed by an extension of the upper wall of the housing 39, and it is provided with a laterally-extending wedge-shaped portion which is inserted within the loop in the thread said wedge-shaped portion being provided with an opening to receive the needle during the operation of removing the thread from the barb of the needle. The housing is carried by an irregularly-shaped frame 43, in which moves a cam 44 on a shaft 45, (see Fig. 9,) which cam causes the frame to slide laterally in a horizontal plane, so that as the loop-opener moves laterally therewith the loop-spreader will move in a lateral direction, and as the loop-spreader moves rearwardly to spread the loop the frame will move in the opposite lateral direction to carry the loop-opener into position to again engage the thread at the beginning of the formation of the next stitch. The bar 38 is operated by a lever 46, fulcrumed at 47 and having an arm 48 engaged by the crank-arm 49, fulcrumed on a shaft B, said arm 49 being operated by a cam 50. The shuttle is also operated from the shaft 45, which is driven by a suitable train of gears in substantially the same manner as indicated in patent to G. L. Corcoran, No. 757,725, of April 19, 1904.

In order to protect the upper of the shoe from the shuttle mechanism, we have provided a door M, which is hinged to the machine and which incloses the shuttle mechanism; said door coöperating with a guide N, carried by the work-table, which acts as a guard for the needle and prevents its engaging any of the work other than that directly upon the table, said mechanism forming the subject of a separate application filed by us August 4, 1905, Serial No. 272,732.

The thread-measuring mechanism, the power mechanism, and kindred accessories of the machine are substantially the same as illustrated in our Patent No. 760,732 of May 24, 1904, and it is not deemed necessary to specifically describe them in this application.

Having thus described the invention, what is claimed as new, and desired to be secured by Letters Patent, is—

1. In a sewing-machine, a shuttle in combination with a loop-opener, a loop-spreader having its end normally adjacent the end of the loop-opener, means for causing said opener and spreader to move into position to engage a strand of thread and thereafter recede from such position, and means for moving said loop-opener in a vertical plane relatively to the loop-opener for carrying it out of the path of movement of the shuttle; substantially as described.

2. In a sewing-machine, a shuttle in combination with a loop-opener, a loop-spreader, means for causing said opener and spreader to penetrate a loop formed in a strand of thread, means for thereafter moving the spreader relatively to the opener for spreading the loop, and means for moving said spreader in a vertical plane relatively to the opener to carry it out of the path of movement of the shuttle; substantially as described.

3. In a sewing-machine, a shuttle, a frame carrying a loop-opener, a support movably mounted on said frame, a loop-spreader oscillatingly mounted on said support and normally occupying a position with its end engaging the end of the loop-opener, means for moving said frame to cause said loop-opener and loop-spreader to enter a loop formed in a strand of thread, means for actuating said support to cause the spreader to spread said loop, and means for oscillating said spreader relatively to the loop-opener for carrying it out of the path of movement of the shuttle; substantially as described.

4. In a sewing-machine, a frame carrying a loop-opener, a slide mounted in said frame and having a loop-spreader pivotally connected thereto, an enlarged head on said loop-spreader, offsets formed in said frame, means for moving said frame laterally, and means for reciprocating said slide relatively to said frame whereby said offsets coöperate with the head on the loop-spreader for moving the same; substantially as described.

5. In a sewing-machine, a shuttle, a needle for forming a loop in a strand of thread, a loop-opener having a passage-way adapted to be entered by the barbed end of said needle, a loop-spreader, means for actuating said opener and said spreader to cause them to enter said loop, means for actuating said spreader to spread the loop, means for moving said spreader in a vertical plane relatively to the opener to carry it out of the path of movement of the shuttle, and means for actuating said shuttle to cause its point to enter said loop and carry the thread away from the needle to complete the formation of the stitch; substantially as described.

6. In a sewing-machine, a shuttle in combination with a loop-opener, a spreader, means for causing said parts to move forwardly into a loop formed in a strand of thread, means for causing said spreader to move in an upward direction out of the path of movement of the shuttle and thence in a direction away from the loop-opener to spread the loop, and then in a direction toward the loop-opener to carry it back to normal position; substantially as described.

7. In a sewing-machine, the combination with complementary mechanism including shafts, of a slidable support carrying a movable loop-spreader, a lever operatively connected to said support, a second lever connected to said first-mentioned lever, means for operating the second-mentioned lever to impart movement to said support, means for returning said second-mentioned lever to normal position, a guide in which said slidable support is adapted to move, a loop-opener carried by said guide, and offsets in said guide to contact with said loop-spreader to tilt the same at an angle to its sliding movement; substantially as described.

8. In a sewing-machine, the combination with a needle having a barb, of pivotally-supported thread-engaging members for laying the thread in engagement with said barb, rock-plates provided with slots having cam projections on the edges thereof, said cam projections on one plate being differently arranged from those on the other plate, connections between said rock-plates and said thread-engaging members, a movable actuating member having means that enter the slots in both of said plates whereby they are operated for causing the thread to be laid in engagement with the barb of the needle without pulling it, a loop-opener and a loop-spreader adapted to enter a loop in the thread, means for actuating said opener and spreader to spread the loop for the entrance of a shuttle, and means for oscillating the loop-spreader to carry it out of the path of the shuttle; substantially as described.

In testimony whereof we hereunto affix our signatures, in the presence of two witnesses, this 3d day of July, 1905.

GEORGE L. CORCORAN.
GEORGE A. DOBYNE.

Witnesses:
F. R. CORNWALL,
GEORGE BAKEWELL.